H. KRIEGER.
DISSOLVING VIEW APPARATUS.
APPLICATION FILED JAN. 30, 1911.
1,001,534.
Patented Aug. 22, 1911.
2 SHEETS—SHEET 1.
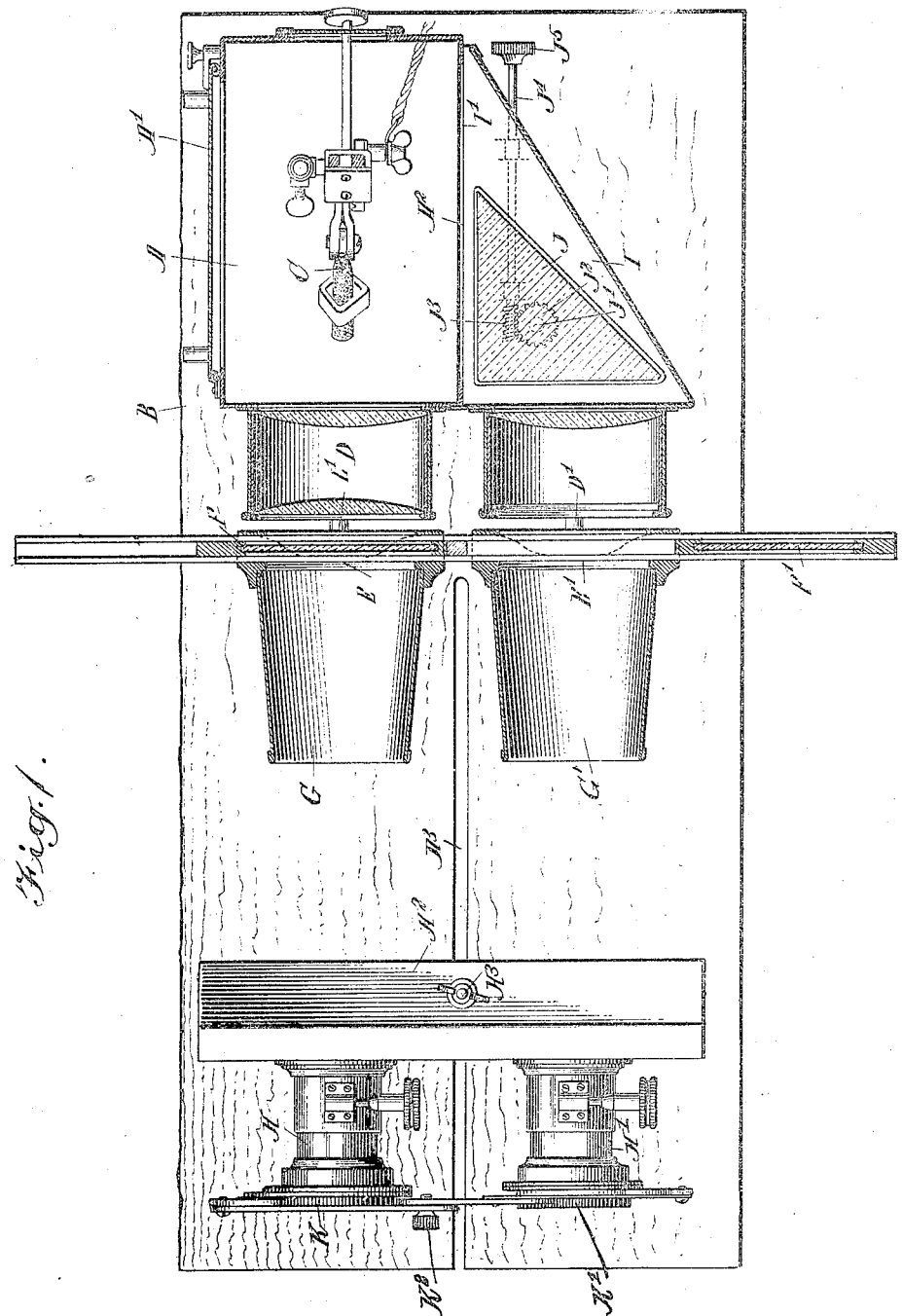
WITNESSES
INVENTOR
Hugo Krieger
BY
ATTORNEYS H. KRIEGER.
DISSOLVING VIEW APPARATUS.
APPLICATION FILED JAN. 30, 1911.
1,001,534.
Patented Aug. 22, 1911.
2 SHEETS—SHEET 2.
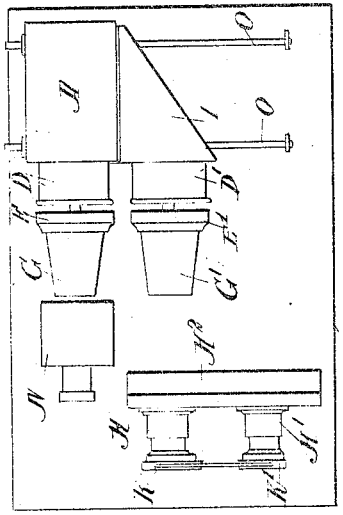
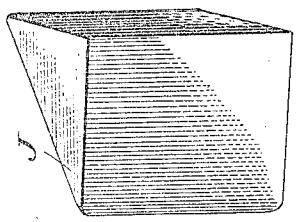
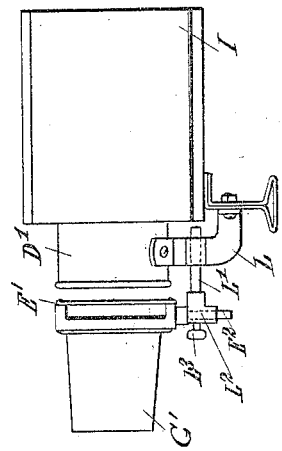
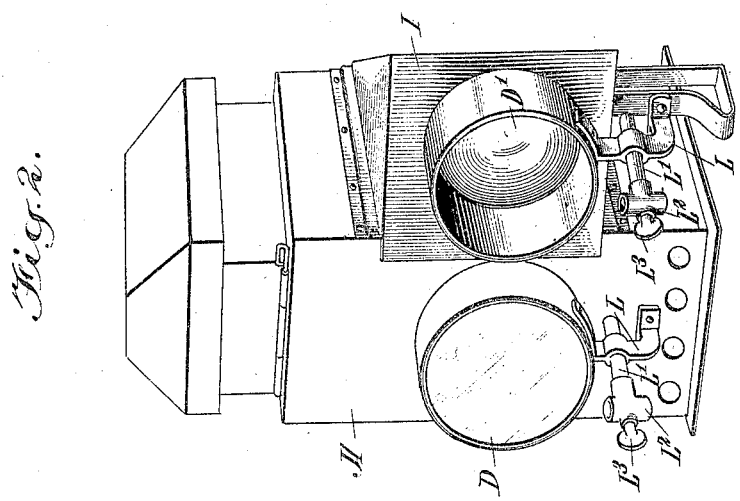
WITNESSES
INVENTOR
Hugo Krieger
BY
ATTORNEYS

UNITED STATES PATENT OFFICE.

HUGO KRIEGER, OF NEW YORK, N. Y.

DISSOLVING-VIEW APPARATUS.

1,001,534. Specification of Letters Patent. Patented Aug. 22, 1911.

Application filed January 30, 1911. Serial No. 605,448.

*To all whom it may concern:*

Be it known that I, HUGO KRIEGER, a subject of the German Emperor, and a resident of the city of New York, borough of the Bronx, in the county and State of New York, have invented a new and Improved Dissolving-View Apparatus, of which the following is a full, clear, and exact description.

The invention relates to optics, and its object is to provide a new and improved dissolving view apparatus, arranged with a single source of light and one lamp casing thus simplifying the construction of the apparatus and requiring less adjustment and attention on the part of the operator.

For the purpose mentioned, use is made of a lamp casing, in which is mounted a pair of condensing lenses, and a source of light in the casing opposite one of the said condensing lenses and a prism opposite the other condensing lens and receiving rays of light from the said source of light, so that the latter supplies the rays of light directly to one condensing lens and indirectly by way of the prism to the other condensing lens.

A practical embodiment of the invention is represented in the accompanying drawings forming a part of this specification, in which similar characters of reference indicate corresponding parts in all the views.

Figure 1 is a sectional plan view of the dissolving view apparatus, the projecting lens being shown in plan view; Fig. 2 is a perspective view of the lamp casing and the condensing lens mounted thereon; Fig. 3 is a side elevation of the housing for the prism and the condensing lens thereof; Fig. 4 is a perspective view of the prism; and Fig. 5 is a diagrammatic plan view showing the dissolving view apparatus applied to the moving picture machine.

The lamp casing A is mounted on a suitable support B and contains a source of light C, which may be in the form of a calcium light, electric arc light, or the like. In front of the source of light C is arranged a condenser D, preferably having two oppositely-disposed plano-convex lenses, as shown in Fig. 1, and in front of the condenser D is arranged a slide carrier E, for receiving a slide or picture F, and on the front of the slide carrier E is arranged a hood G, in the form of a frustum of a cone, the axis of which coincides with the axis of the condenser D. In front of the hood G and in axial alinement thereof and the condenser D is arranged a projecting lens H, of the usual construction for projecting the object onto a distant screen.

One side of the lamp casing A is provided with a door A', and the opposite side is provided with an opening A², registering with an opening I' formed in a housing I containing a prism J, in front of which is arranged a condenser D' attached to the front of the housing I. The condenser D' is preferably provided with a single condensing lens of plano-convex shape, as indicated in Fig. 1. In front of the condenser D' is arranged a slide carrier E', for receiving a slide or a picture F', and on the slide carrier E' is arranged a hood G', similar to the hood G, and in axial alinement with the condenser D'. In front of the hood G' is arranged a projecting lens H', similar to the projecting lens H, and the said projecting lenses H and H' are provided with dissolving shutters K, K' operated in unison with each other from a handle K² under the control of the operator, so that when one shutter K is opened the other is simultaneously closed and vice versa. The projecting lenses H and H' are mounted on a suitable standard H², adjustably secured to the support B by a screw H³, extending through a longitudinal slot A³ formed on the support B.

The bottom of the prism J is provided with a shaft J' journaled in the bottom of the housing I, and on the said shaft J' is secured a worm wheel J² in mesh with a worm wheel J³ secured on the forward end of a shaft J⁴ journaled in suitable bearings arranged on the under side of the housing I. The rear end of the shaft J⁴ terminates in a handle J⁵ under the control of the operator for imparting a rotary motion to the shaft J⁴, which by the worm J³ and the worm wheel J² turns the prism J so as to change the position of the sides thereof relative to the source of light C and the condenser D, respectively. Normally the forward side of the prism J is at right angles to the axis of the condenser D', while the other side is parallel to the axis of the condensers D and D'.

It will be seen that the rays of light from the source of light C pass directly to the condenser D and indirectly to the condenser D' by way of the prism J, so that only one source of light C and one lamp casing A is required for furnishing the proper amount of light to the condensers D and D'. When the several parts are in the position shown in Fig. 1, a slide F is in projecting position in front of the condenser D, and the subject matter of this slide F is now projected by the projecting lens H and its open shutter K onto the screen. When it is desired to dissolve the subject matter of the slide F with the subject matter of the slide F', then the operator takes hold of the handle K² and gradually closes the shutter K while simultaneously opening the shutter K', at the same time the slide F' is placed in position in front of the condenser D', so that the subject matter of this slide F' is projected onto the screen by the projecting lens H', and as the projected subject matter of the slide F is gradually dimmed by closing the shutter K, and the subject matter of the slide F' is gradually brightened on opening the shutter K', it is evident that the two pictures are dissolved. By turning the prism into an angular position relative to the condenser D' the projected image can be shifted on the screen, so as to properly coincide with the image projected by the projecting lens H to insure proper registry of the projected images. The slide carriers E and E' and the hoods G, G' held thereon are preferably adjustably supported from the casing A and the housing I, and for this purpose supports L are attached to the lamp casing A and the housing I (see Fig. 2), and each support L slidingly receives a rod L' terminating in a bearing L² engaged by a vertical pin E² depending from the bottom of the corresponding slide carrier E or E' (see Fig. 3). A set screw L³ in the bearing L² serves to fasten the pin E² in place after the slide carrier E or E' is adjusted up or down or toward or from the condensing lens D or D', so that the slide carriers are in the proper positions relative to the condensers D and D'.

When it is desired to use the dissolving view apparatus in connection with a moving picture machine N, as shown in Fig. 5, then the lamp casing A and the parts attached thereto are mounted to slide sidewise on a guideway O, to move the condenser D in axial alinement with the moving picture machine, while the condenser D' moves into axial position with the projecting lens H, as indicated in Fig. 5. The condenser D now supplies the necessary light for projecting moving pictures onto the screen, while the condenser D' supplies the light for projecting a picture onto the screen by way of the projecting lens H, the other projecting lens H' not being used at this time. The guideway O is provided with end stops to limit the sliding movement of the lamp casing in either direction and thus insure accurate register of the parts in either position of the lamp casing.

In supplying a lamp casing of a moving picture machine, such as are now in use, with the housing I, prism J, condenser D' and slide carrier E', it is only necessary for the owner of such a machine to provide one side of the lamp casing A with the opening A², and then secure the housing I in position on this side of the lamp casing, so that one of the two lamp casings and two sources of light therefor, as now generally used on ordinary moving picture machines, can be dispensed with, and only one lamp casing A and its source of light C used instead.

It is understood that by using one source of light for both condensers the expense in using the apparatus is greatly reduced, and the operator is not required to dim one source of light while brightening the other when projecting dissolving views or using the apparatus in connection with a moving picture machine.

From the foregoing it is evident that the operator can give his whole attention to the changing of the slides and the manipulating of the connected shutters K, K', and thus obtain better effects by causing one picture to gradually fade away while the other appears visible out of the haze of the disappearing one.

Having thus described my invention, I claim as new and desire to secure by Letters Patent:

1. A dissolving view apparatus, provided with a lamp casing, condensers mounted on the said lamp casing, and having their axes arranged parallel one to the other, a source of light in the lamp casing opposite one of the said condensers, and a prism interposed between the other condenser and the said source of light.

2. A dissolving view apparatus provided with a lamp casing, a source of light therein, a pair of condensers mounted on the said main casing and having their axes arranged parallel one to the other, one of the condensers being in front of the said source of light, and a prism adjacent the said source of light and opposite the other condenser.

3. A dissolving view apparatus provided with a lamp casing provided at one side with a prism housing, a prism in the said housing, a source of light in the said casing, and a pair of condensers having their axes arranged parallel one to the other and of which condensers one is mounted on the said prism housing.

4. A dissolving view apparatus provided with a lamp casing provided at one side with a prism housing, a prism in the said housing and mounted to turn, manually controlled means for turning the said prism, a source of light in the said casing, and a pair of condensers having their axes arranged parallel one to the other, and of which condensers one is mounted on the said casing in front of the said source of light and the other condenser is mounted on the said prism housing.

5. In combination with a moving picture machine, a guideway transverse to the said moving picture machine and in the rear thereof the guideway being provided with end stops, a lamp casing mounted to slide on the said guideway and provided with two condensers having their axes parallel one to the other, and a pair of parallel projecting lenses to one side of the moving picture machine, the said condensers in one position of the casing being in register with both projecting lenses, and in another position of the casing one of the condensers being in register with the moving picture machine and the other condenser being in register with one of the said projecting lenses.

6. A dissolving view apparatus provided with a lamp casing, condensers mounted on the said lamp casing and having their axes parallel one to the other, a source of light in the lamp casing opposite one of the said condensers, a prism interposed between the other condenser and the said source of light, and manually-controlled means for turning the said prism to change the position of the sides of the prism relative to the source of light and the corresponding condensers.

7. In combination, with a moving picture machine, a guideway transverse to the said moving picture machine and in the rear thereof the guideway being provided with end stops, a lamp casing mounted to slide on the said guideway and provided with two condensers having their axes parallel one to the other, a single source of light in the said casing opposite one of the said condensers, a prism interposed between the said source of light and the other condenser, and a pair of parallel projecting lenses to one side of the moving picture machine, the said condensers in one position of the casing being in register with both projecting lenses, and in another position of the casing one of the condensers being in register with the moving picture machine and the other condenser being in register with one of the said projecting lenses.

8. A dissolving view apparatus, comprising a lamp casing provided at one side with a prism housing, a source of light in the said lamp casing, a double lens condenser on the front of the said casing and in front of the said source of light, a single lens condenser in front of the said prism housing, the said condensers having parallel axes, and a prism in the said prism housing and interposed between the said source of light and the said single lens condenser.

9. A dissolving view apparatus, comprising a lamp casing provided at one side with a prism housing, a source of light in the said lamp casing, a double lens condenser on the front of the said casing and in front of the said source of light, a single lens condenser in front of the said prism housing, the said condensers having parallel axes, a prism in the said prism housing and interposed between the said source of light and the said single lens condenser, transversely alined slide carriers in front of the said condensers, projecting lenses in front of the said slide carriers and in axial alinement with the said condensers and independent thereof, and shutters for the said projecting lenses.

In testimony whereof I have signed my name to this specification in the presence of two subscribing witnesses.

HUGO KRIEGER.

Witnesses:
  THEO. G. HOSTER,
  PHILIP D. ROLLHAUS.